United States Patent
Skrycki

[11] 3,877,708
[45] Apr. 15, 1975

[54] GASKET

[75] Inventor: Robert R. Skrycki, Grosse Ile, Mich.

[73] Assignee: McCord Corporation, Detroit, Mich.

[22] Filed: Apr. 2, 1973

[21] Appl. No.: 347,279

[52] U.S. Cl.............................. 277/235 R; 220/358
[51] Int. Cl............................................. F16j 15/12
[58] Field of Search........ 277/235 R, 235 A, 235 B, 277/171, 229, 234, 189.5; 220/46 MS, 358, 357

[56] References Cited
UNITED STATES PATENTS

| | | | |
|---|---|---|---|
| 674,903 | 5/1901 | Callaway | 277/235 |
| 1,485,252 | 2/1924 | Denis | 277/229 |
| 1,626,110 | 4/1927 | Bailey et al. | 277/235 B |
| 1,731,404 | 10/1929 | Wetherill | 277/207 |
| 1,798,246 | 3/1931 | Braner | 277/235 |
| 1,829,248 | 10/1931 | Victor | 277/235 B |
| 1,897,088 | 2/1933 | Victor | 277/235 |
| 2,404,409 | 7/1946 | Smith | 277/271 |
| 3,058,752 | 10/1962 | Miller | 277/207 A |

FOREIGN PATENTS OR APPLICATIONS

| | | | |
|---|---|---|---|
| 1,055,460 | 4/1959 | Germany | 277/207 A |
| 240,118 | 9/1964 | Austria | 277/207 A |

Primary Examiner—Richard E. Aegerter
Assistant Examiner—John W. Shepperd
Attorney, Agent, or Firm—McGlynn and Milton

[57] ABSTRACT

A gasket for perfecting a seal between a walled canister member and an adjacent surface defined by a housing. The seal has an outer steel shell with a core disposed within the steel shell comprising asbestos disposed on either side of a perforated metal plate member. The seal has a cross section including first and second spaced sides, which taper toward one another and which engage the wall of the canister and the adjacent surface of the housing, and a flange extending laterally from one of the sides for resting upon the top of the wall of the canister.

8 Claims, 3 Drawing Figures

PATENTED APR 1 5 1975    3,877,708
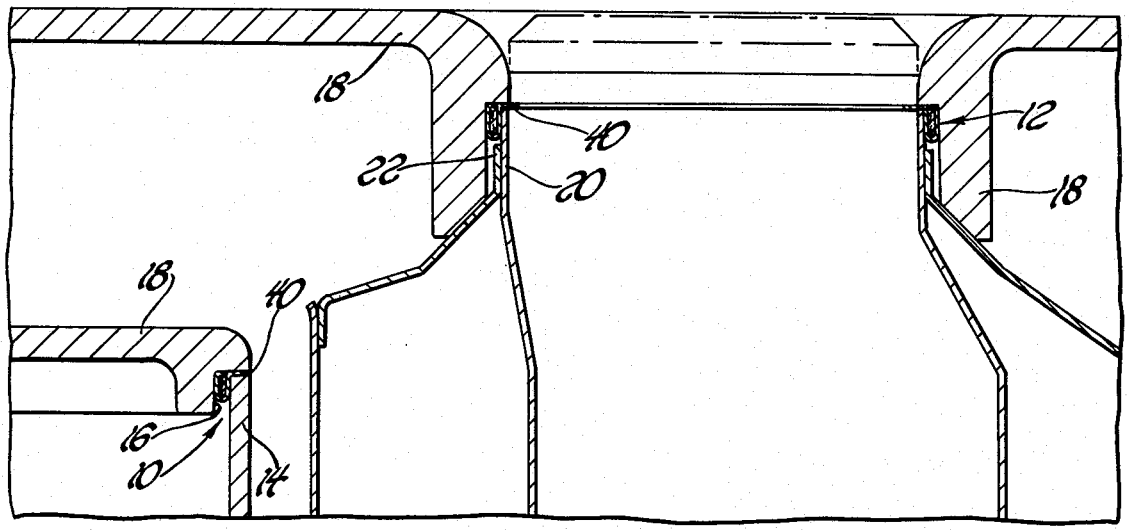
Fig. 1
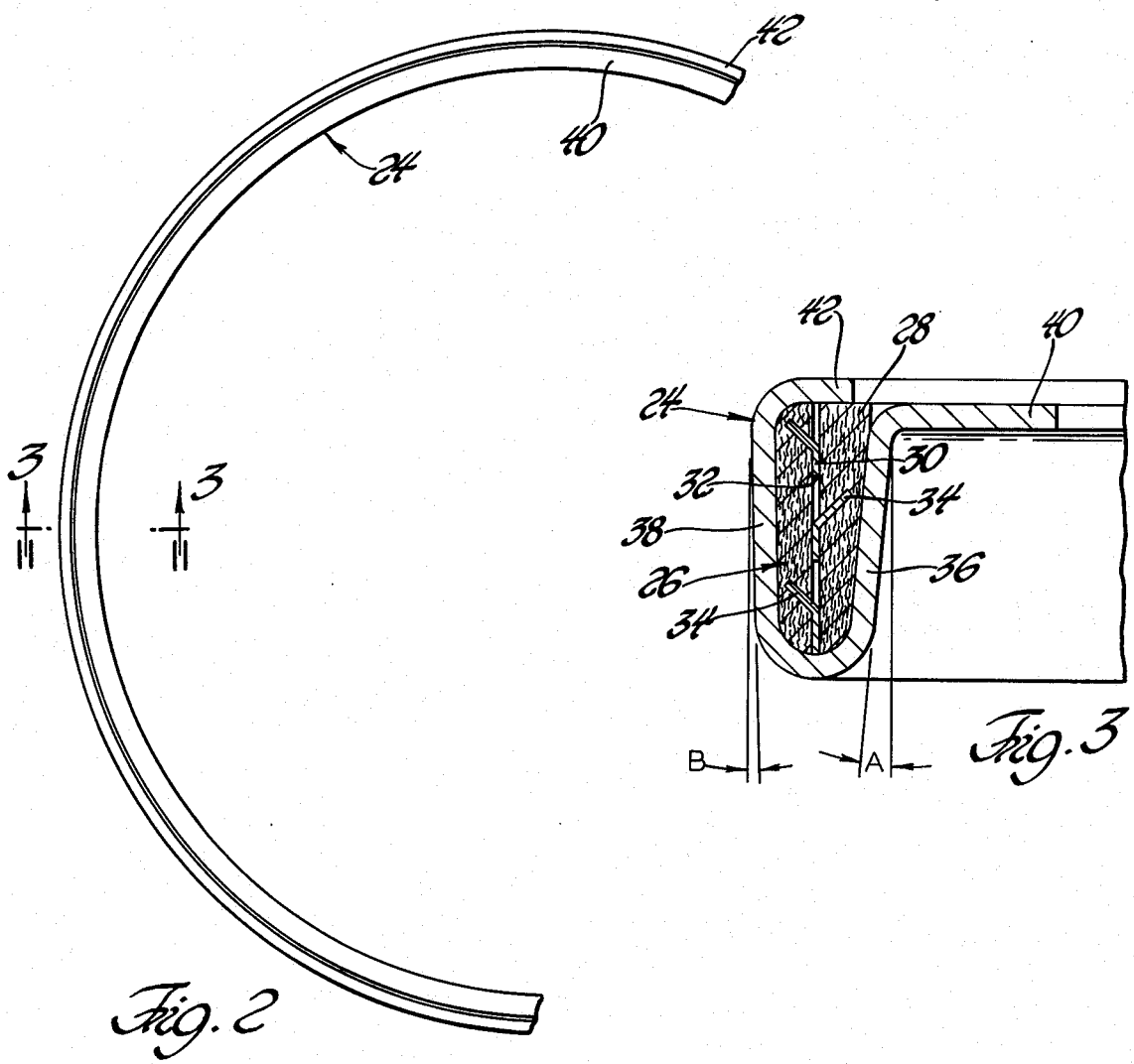
Fig. 2
Fig. 3

GASKET

The instant invention relates to a gasket and more particularly to a gasket which is used to perfect a seal between a walled member such as a canister and an adjacent surface such as that presented by a housing to which the canister is sealed.

Canisters which must be sealed to an adjacent housing are utilized in catalytic converters in exhaust systems. Such a canister utilized in an exhaust system is normally urged into sealing engagement with the member to which it is to be sealed by a bolt which interconnects that member and the canister. It has been customary to utilize a seal between the top of the wall defining the top opening of the canister and the member to which it is to be sealed. The problem with such an arrangement is that the thermal expansion of the bolts holding the canister in sealing relationship with the member to which it is to be sealed is different than the thermal expansion of the canister. This difference in thermal expansion affects the sealing effectiveness of the seal disposed between the top of the wall of the canister and the member to which it is to be sealed.

Accordingly, it is an object and feature of this invention to provide a gasket which may be disposed between the side of the wall of a member and an adjacent surface to accommodate relative movement between the wall and the surface due to differences in expansion, etc., while maintaining an effective seal.

In correlation with the foregoing object and feature, it is an object and feature of this invention to provide such a gasket having a cross section including first and second spaced sides and a flange extending laterally from the first side for resting upon the top of the wall of a member to be sealed.

In correlation with the foregoing objects and features, it is another object and feature of this invention to provide such a gasket wherein the first and second sides of the gasket taper toward one another as viewed in cross section.

Other objects and attendant advantages of the present invention will be readily appreciated as the same becomes better understood by reference to the following detailed description when considered in connection with the accompanying drawings wherein:

FIG. 1 is a fragmentary cross-sectional view showing a preferred embodiment of the gasket of the instant invention utilized in two different sealing positions;

FIG. 2 is a fragmentary plan view of a preferred embodiment of a gasket of the instant invention; and FIG. 3 is a cross-sectional view taken substantially along line 3—3 of FIG. 2.

Gaskets constructed in accordance with the instant invention are generally shown at 10 and 12 in FIG. 1. Each gasket 10 and 12 perfects a seal between a walled member and an adjacent surface. More specifically, the gasket 10 perfects a seal between the annular wall 14 of a canister and the adjacent surface 16 of a housing 18. Actually, in this environment, the canister 14 is part of a catalytic converter and the housing 18 is the exhaust manifold for an internal combustion engine such as that used in an automobile.

In a similar manner, the gasket 12 perfects a seal between the walled member 20 and the adjacent surface 22 of the housing 18. The walled member 20 is an annular member disposed in sealing relationship with the manifold 18 by the annular gasket 12.

As alluded to above, bolts interconnect the canister 14 and the manifold 18 to urge the canister 14 into sealing engagement with the manifold 18. In normal prior art environments, the sealing member would be disposed on top of or at the end of the annular wall 14. The instant gasket, however, is disposed between the outer wall of the canister 14 and the adjacent surface 16 of the manifold 18.

The gasket configuration is more thoroughly shown in FIGS. 2 and 3. The gasket includes an outer stainless steel shell, generally indicated at 24, disposed about a core, generally indicated at 26. The core 26 includes asbestos 28 attached to opposite sides of a perforated plate member 30. The plate member 30 has perforations 32 therein resulting from the tabs 34 having been struck thereoutof and extending from opposite faces of the plate. The plate 30 is preferably made of metal. The shell 24 includes first and second sides 36 and 38 which, as viewed in cross section as shown in FIG. 3, taper toward one another.

The shell 24 also includes a flange 40 which extends laterally from the first side 36 in a direction away from the second side 38.

The shell 24 includes a lip 42 which extends laterally from the second side 38 in a direction toward the first side 36 to cover the core 26.

As mentioned above, the sides 36 and 38 are tapered toward one another. More specifically, the first side 36 is preferably disposed at an angle A which is approximately 3° relative to a plane or line perpendicular to the flange 40. Said another way, the side 36 is disposed at an angle of approximately 93° from the flange 40; i.e., the angle between the side 36 and the flange 40 is approximately 93°.

The second side may also be disposed at an angle B which is between 0° and 3° relative to a plane perpendicular to the flange 40. Said another way, the second side 38 may be disposed at an angle of between 87° and 90° relative to the flange 40 when measured in a counterclockwise direction between the side 38 and the flange 40.

As illustrated, the gaskets 10 and 12 are annular in configuration and the flange 40 of each gasket rests upon the top of the adjacent walled member or canister, the side wall of which is sealed with an adjacent surface. More specifically, the flange 40 of the gasket 10 rests on the top of the annular wall of the canister 14 with the inner wall of the gasket engaging the outer wall of the canister 14 and the outer wall of the gasket engaging the adjacent surface 16 of the manifold housing 18.

The tapered walls 36 and 38 facilitate disposition of the annular gasket 10 upon the canister 14. Additionally, the outer walls of the canister 14 may be tapered to facilitate the disposition of the gasket 10 upon the top of the annular wall of the canister 14.

It will be appreciated that the gasket 10 is compressed between the inner wall of the canister 14 and the adjacent surface 16 to effect the sealing therebetween and to allow relative longitudinal or sliding movement between the canister 14 and the surface 16 while maintaining an effective seal.

It will also be understood that the configuration of the gasket may be reversed whereby the walls 36 and 38 are disposed on the outside diameter or on the outside wall of the canister with the flange 40 extending radially inwardly so as to be disposed on top of the wall of the canister to be sealed.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or priviledge is claimed are defined as follows:

1. An endless gasket for perfecting a seal between two members, comprising: an endless outer shell; a core disposed with said shell; said shell having first and second sides which, as viewed in cross section, taper toward one another; a flange connected to said first side extending generally laterally away from said shell, said flange extending a substantially constant distance from said first side about the periphery of said shell; a lip connected to said second side extending generally in the direction of said flange and terminating short of said first side covering at least a portion of said core to retain the same; and means interconnecting said sides for allowing said sides to move toward one another when the exposed surfaces of said sides are engaged by and compressed between the two members to permit compression of said shell.

2. A gasket as set forth in claim 1 wherein at least one of said sides is disposed at an angle of approximately 3° to a plane perpendicular to said flange.

3. A gasket as set forth in claim 1 wherein said first side is disposed at an angle of approximately 93° from said flange.

4. A gasket as set forth in claim 3 wherein said second side is disposed at an angle between 87° and 90° from said flange.

5. A gasket as set forth in claim 4 wherein said shell is made of steel, said core comprises asbestos.

6. A gasket as set forth in claim 5 wherein said asbestos is attached to opposite sides of a perforated metal plate member.

7. A gasket for perfecting a seal between a walled member and an adjacent surface, said gasket comprising: an endless outer shell having a cross section including first and second spaced sides for engaging a wall of the walled member and the adjacent surface, a core disposed within said shell, a flange connected to said first side extending laterally away from said shell for resting upon the top of the wall of the walled member, said flange extending a substantially constant distance from said first side about the periphery of said shell, a lip connected to said second side extending generally in the direction of said flange and terminating short of said first side covering at least a portion of said core to retain the same, and means interconnecting said sides for allowing said sides to move toward one another when the exposed surfaces of said sides are engaged by and compressed between the two members.

8. A gasket as set forth in claim 7 wherein said gasket is annular.

* * * * *